United States Patent
Myoren et al.

(10) Patent No.: US 8,425,185 B2
(45) Date of Patent: Apr. 23, 2013

(54) TRANSONIC BLADE

(75) Inventors: Chihiro Myoren, Tokai (JP); Yasuo Takahashi, Mito (JP)

(73) Assignee: Hitachi, Ltd., Tokyo (JP)

( * ) Notice: Subject to any disclaimer, the term of this patent is extended or adjusted under 35 U.S.C. 154(b) by 558 days.

(21) Appl. No.: 12/707,493

(22) Filed: Feb. 17, 2010

(65) Prior Publication Data
US 2010/0215503 A1    Aug. 26, 2010

(30) Foreign Application Priority Data

Feb. 25, 2009    (JP) ................................ 2009-041645

(51) Int. Cl.
    *F01D 5/14*    (2006.01)
(52) U.S. Cl.
    USPC ..................... 415/192; 419/242; 419/DIG. 5
(58) Field of Classification Search ............ 416/DIG. 2, 416/DIG. 5, 237, 242, 243; 415/192
See application file for complete search history.

(56) References Cited

U.S. PATENT DOCUMENTS

| | | | |
|---|---|---|---|
| 3,989,406 A | 11/1976 | Bliss | |
| 4,585,395 A | 4/1986 | Nourse et al. | |
| 4,714,407 A * | 12/1987 | Cox et al. | 415/192 |
| 4,726,737 A * | 2/1988 | Weingold et al. | 416/223 A |
| 5,131,815 A | 7/1992 | Yamaguchi et al. | |
| 5,642,985 A * | 7/1997 | Spear et al. | 416/238 |
| 6,071,077 A * | 6/2000 | Rowlands | 416/223 A |
| 6,755,612 B2 * | 6/2004 | Shahpar et al. | 415/192 |
| 7,108,486 B2 * | 9/2006 | Talbotec et al. | 416/243 |
| 7,476,086 B2 * | 1/2009 | Wadia et al. | 416/223 R |
| 7,547,186 B2 * | 6/2009 | Schuster et al. | 415/119 |
| 2008/0181769 A1 * | 7/2008 | Wilson et al. | 415/181 |

FOREIGN PATENT DOCUMENTS

| | | |
|---|---|---|
| EP | 2 080 909 A1 | 7/2009 |
| JP | 03-138491 | 6/1991 |
| JP | 07-224794 | 8/1995 |
| JP | 09-060501 | 3/1997 |
| JP | 2008-115736 | 5/2008 |

* cited by examiner

*Primary Examiner* — Edward Look
*Assistant Examiner* — Liam McDowell
(74) *Attorney, Agent, or Firm* — Foley & Lardner LLP (57) ABSTRACT

A transonic blade is provided that operates in a flow field where flow has a transonic speed or higher in an axial-flow rotating machine and that concurrently achieves a reduction in shock loss and in the local stress of the blade. The transonic blade includes a hub cross-sectional surface joined to a rotating shaft or an outer circumferential side casing of a rotating machine; a tip cross-sectional surface located furthest from the hub cross-sectional surface in a spanwise direction which is a vertical direction of the rotating shaft; a leading edge located on an upstream side; and a trailing edge located on a downstream side. At least a part of a passing working fluid flow has a transonic speed or higher. A portion of a stacking line which is a line connecting together respective gravity centers of cross-sectional surfaces located from the hub cross-sectional surface to the tip cross-sectional surface is located on a downstream side of a stacking center in a flow direction of a working fluid main flow.

10 Claims, 8 Drawing Sheets

BASELINE BLADE         FIRST EMBODIMENT

TRANSONIC BLADE

CROSS-REFERENCE TO RELATED APPLICATION

This application claims the benefit and priority of Japanese Patent Application No. 2009-041645 filed Feb. 25, 2009. The foregoing application is incorporated by reference herein in its entirety.

BACKGROUND OF THE INVENTION

1. Field of the Invention

The present invention relates to an axial-flow rotating machine provided with a transonic blade used in a flow field where an overall or partial flow has a transonic speed or higher.

2. Description of the Related Art

In the context of increased fuel cost and of the raising of environmental awareness in recent years, the importance of improved efficiency has been raised in axial-flow rotating machines such as industrial gas turbines and jet engines. One of means of improving efficiency in the axial-flow rotating machine is to reduce a blade loss. The blade loss is classified roughly into a profile loss occurring at a cross-sectional surface (airfoil) of a blade in the radial direction of a rotating shaft and the other losses. Examples of the other losses include a shock loss and a secondary loss. The recent axial-flow rotating machines have a large load per one stage and an increased Mach number of working fluid flowing into a blade. Therefore, the shock loss tends to increase. In other words, a reduction in shock loss largely contributes to an improvement in performance of the rotating machine.

The studies of reducing a shock loss have been made in the past. One of them is to modify a stacking line shape. JP-7-224794-A describes a blade whose stacking line is tilted toward the upstream side. JP-2008-115736-A describes a blade in which cross-sectional surfaces from a mean cross-sectional surface to a hub cross-sectional surface and a tip cross-sectional surface are shifted toward the upstream side to form an S-shaped stacking line and an amount of shifting the tip cross-sectional surface is maximized.

SUMMARY OF THE INVENTION

However, JP-7-224794-A and JP-2008-115736-A do not sufficiently discuss the strength of the transonic blade with respect to the modification of the stacking line.

The transonic blades described in JP-7-224794-A and JP-2008-115736-A are formed such that the overall gravity center position is shifted toward the upstream side in order to reduce various losses due to a shock wave at the tip cross-sectional surface. The blade whose gravity center position is shifted as described above has a problem of increasing local stress in the vicinity of the leading edge of the hub cross-sectional surface compared with a transonic blade having a stacking line perpendicular to a vertical direction.

Accordingly, it is an object of the present invention to provide a transonic blade that reduces local stress at a hub cross-sectional surface while achieving a reduction in shock loss at a tip cross-sectional surface.

According to an aspect of the present invention, there is provided a transonic blade including: a hub cross-sectional surface joined to a rotating shaft or an outer circumferential side casing of a rotating machine; a tip cross-sectional surface located furthest from the hub cross-sectional surface in a spanwise direction which is a vertical direction of the rotating shaft; a leading edge located on an upstream side in a flow direction of a working fluid main flow; and a trailing edge located on a downstream side in the flow direction of the working fluid main flow; wherein at least a part of a passing working fluid flow has a transonic speed or higher; and wherein a portion of a stacking line which is a line connecting together respective gravity centers of cross-sectional surfaces located from the hub cross-sectional surface to the tip cross-sectional surface is located on the downstream side of a stacking center which corresponds to a gravity center position of the hub cross-sectional surface in the flow direction of the working fluid main flow.

The present invention can provide a transonic blade that can reduce local stress at the hub cross-sectional surface while achieving a reduction in shock loss resulting from a shock wave on the tip cross-sectional surface.

DESCRIPTION OF THE PREFERRED EMBODIMENTS

In a blade of a rotating machine, when a main flow velocity increases and comes close to acoustic velocity, shock waves occur on a blade surface. This increases resistance to degrade performance of the rotating machine. The studies of reducing a shock loss have been made in the past. One of them is to modify the shape of a stacking line. The stacking line is a line connecting together the gravity center positions of airfoil at respective spanwise positions. In traditional blade design, a method has widely been executed of straightly stacking the gravity centers of airfoil to make the stacking line linear in view of strength. However, the recent axial-flow rotating machines have tended to have a large load per one stage so that the influence of a shock loss on the performance of the rotating machine has been increased. To cope with the increased shock loss, a design method of modifying a stacking line shape has been begun to be studied.

As described in JP-7-224794-A, at first this study is mainly such that the stacking line is simply tilted and the number of its flexion points is one or less. The blade described in JP-7-224794-A has the stacking line tilted toward the upstream side. The cross-sectional surface (the tip cross-sectional surface), adjacent to a casing, having a high-inflow-Mach number has concern about development of a boundary layer from a solid wall such as tip leakage flow or secondary flow. To deal with this concern, the stacking line is tilted toward the upstream side, which can suppress the development of the boundary layer from the solid wall and the enlargement of the boundary layer due to interference with a shock wave, thereby reducing a loss. However, the blade in this case is shaped such that the tip cross-sectional surface side of the stacking line is forwardly tilted toward the upstream side. The flow on the tip side begins to increase its velocity earlier than the flow on the side of the cross-sectional surface (the hub cross-sectional surface) where the rotating shaft or the casing is joined to the blade. The static pressure on the tip side drops. Consequently, the flow of the working fluid from the hub cross-sectional surface side to the tip cross-sectional surface side is promoted and the flow rate of the working fluid on the hub cross-sectional surface side is reduced. In other words, the boundary layer tends to develop on the hub cross-sectional surface side, which undesirably increases a loss.

JP-2008-115736-A describes the blade as below. The cross-sectional surfaces from a mean cross-sectional surface to the hub cross-sectional surface and the tip cross-sectional surface are shifted toward the upstream side to form an S-shaped stacking line. In addition, the amount of shifting the tip cross-sectional surface is maximized. The mean cross-sectional surface is a cross-sectional surface located at the middle between the hub cross-sectional surface and the tip cross-sectional surface. In contrast to the blade described in JP-7-224794-A, the blade described in JP-2008-115736-A is shaped such that the blade cross-sectional surfaces adjacent to the mean cross-sectional surface are located on the more downstream side. This blade shaped as above suppresses an increase in loss on the hub side, the increased loss being a defect of the blade described in JP-7-224794-A having only one flexion point on the stacking line. Since separation at the hub cross-sectional surface is suppressed, a stall margin can be increased. In addition, since the blade is shaped such that the tip side is shifted toward the upstream side, various losses caused by the shock wave may be reduced.

On the other hand, the present invention described by use of following embodiments is reached by inventors who study to provide a transonic blade that obviously achieves suppressed separation at a hub cross-sectional surface while reducing a loss due to a shock wave, and that is superior in view of reliability. The transonic blade of the present invention is specifically such that a difference $\epsilon$ in the lengthwise direction of a rotating shaft between the gravity center of an overall transonic blade and the stacking center which is the gravity center position of the hub cross-sectional surface is set not to exceed a strength limit of the leading edge of the hub cross-sectional surface. Further, a portion of the stacking line which is a line connecting together the respective gravity centers of the cross-sectional surfaces from the hub cross-sectional surface to the tip cross-sectional surface is located on the downstream side of the stacking center in the flow direction of the working fluid main flow.

The inventions described in JP-7-224794-A and in JP-2008-115736-A reduce the loss by tilting the stacking line toward the upstream side. However, this poses a problem in that the gravity center position of the blade is shifted toward the upstream side, which particularly increases local stress adjacent to the leading edge of the hub cross-sectional surface.

In contrast to this, the present invention can suppress a decrease in reliability by setting "$\epsilon$" not to exceed the strength limit of the leading edge of the hub cross-sectional surface. In this case, even if the stacking line is locally shifted to the upstream side (forward sweep), a portion of the stacking line is made to be located on the downstream side of the stacking center. This is because the gravity center of the overall transonic blade can be shifted toward the downstream side so that the gravity center position of the overall blade can be brought close to the stacking center. In other words, the present invention can adopt various airfoils that can reduce a loss due to a shock wave in addition to suppressing the degradation in reliability. In addition, since the transonic blade of the present invention can maintain high structural strength, it is not necessary to use an expensive material, which may produce an effect of cost reduction.

Incidentally, for the traditional blade that does not modify the shape of a stacking line, a method of stacking airfoils with their gravity centers aligned to each other in the lengthwise direction of a rotor 11 is common knowledge in view of strength and others. The invention described in JP-7-224794-A and in JP-2008-115736-A aims to reduce a loss by modifying the stacking line while intending to improve efficiency with knowledge of disadvantage in strength, i.e., in reliability. The present invention is superior in terms of devising structure to suppress the lowering of reliability while modifying the stacking line. Incidentally, if "$\epsilon$" is made to be generally equal to zero, that is, if the rotating shaft-lengthwise position of the gravity center of the overall transonic blade is made to coincide with that of the stacking center, reliability is further enhanced.

According to the present invention, the stacking line between the hub cross-sectional surface and the mean cross-sectional surface is shaped to protrude toward the upstream side. Therefore, similarly to JP-2008-115736-A the development of the boundary layer on the hub side can be suppressed compared with a transonic blade whose overall stacking line is simply tilted toward the upstream side like JP-7-224794-A. In addition, the stacking line between the mean cross-sectional surface and the tip cross-sectional surface is made to protrude toward the downstream side to S-shape the overall stacking line. Therefore, the cross-sectional area distribution in the flow direction can be smoothed to reduce the inflow Mach number between the mean cross-sectional surface and the tip cross-sectional surface. This can reduce a loss due to shock waves. Further, the gravity center position between the mean cross-sectional surface and the tip cross-sectional surface is shifted to the downstream side so that the gravity center of the overall blade comes close to the stacking center. Therefore, it is possible to suppress an increase in local stress on the hub cross-sectional surface as described above.

Preferred embodiments of the present invention will hereinafter be described with reference to the drawings.

First Embodiment

Figure 2:
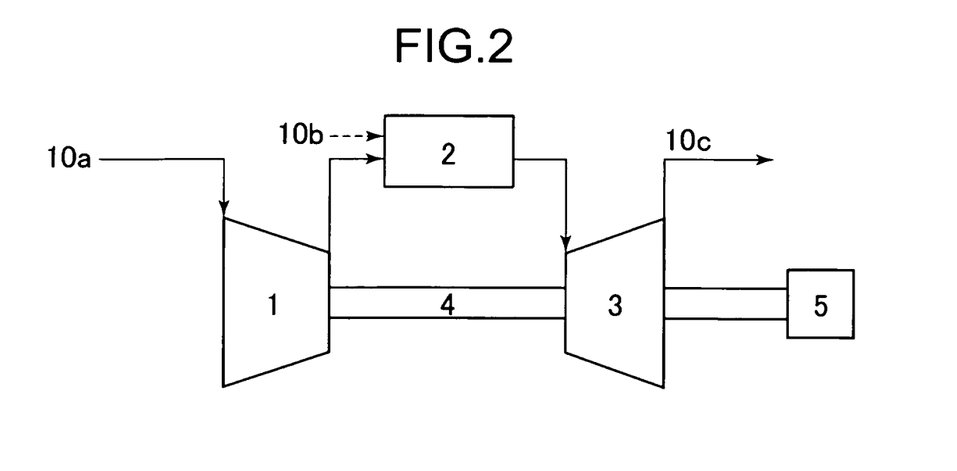
FIG. 2 is a cycle configuration diagram of an axial-flow rotating machine into which the transonic blade of the first embodiment is built.

FIG. 2 is a cycle configuration diagram of an axial-flow rotating machine into which a transonic blade of a first embodiment is built. The axial-flow rotating machine is described taking a gas turbine compressor as an example.

A description is first given of an outline of a cycle. Working fluid 10a first flows into an axial-flow compressor 1. The working fluid 10a compressed by the compressor 1 flows into a combustor 2, in which the compressed working fluid is mixed and burned together with fuel 10b injected thereinto to produce high temperature high pressure combustion gas 10c. The high temperature high pressure combustion gas 10c flows into a turbine 3. The combustion gas 10c flowing into the turbine 3 rotates a shaft 4 to drive a generator 5 for electric power generation.

Figure 3:
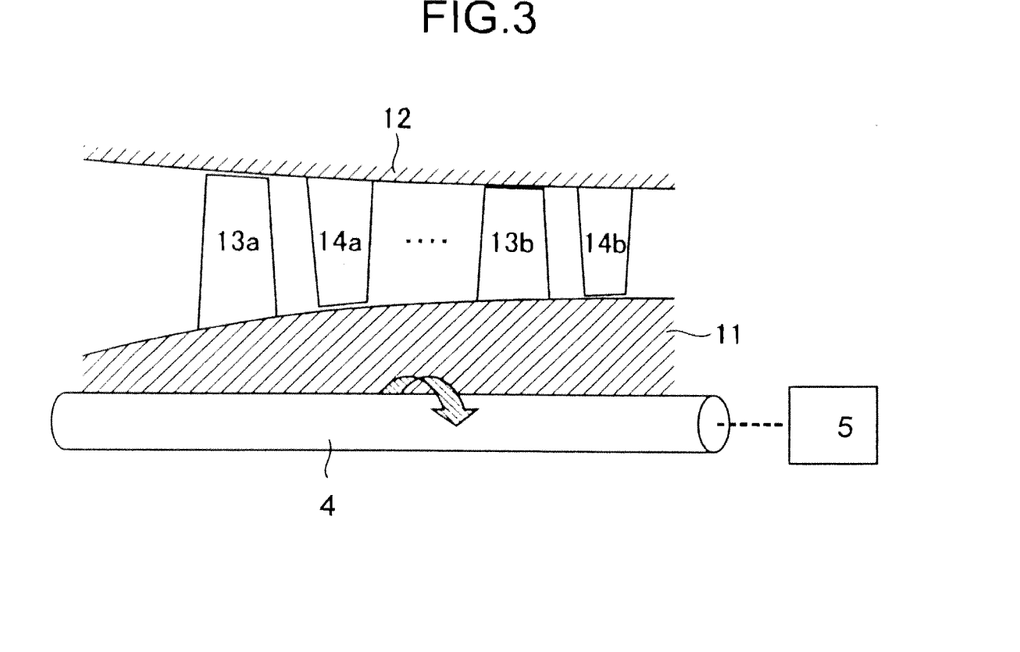
FIG. 3 is a cross-sectional view of an axial-flow compressor taken along a meridional plane.

FIG. 3 is a cross-sectional view of the axial-flow compressor 1 taken along a meridional plane. Referring to FIG. 3, the compressor 1 is configured to include a rotor 11 or a rotating shaft; a casing 12; rotor blades 13 joined to the outer circumferential side of the rotor 11; and stationary blades 14 joined to the casing 12. The working fluid is compressed by passing between the outer circumferential side of the rotor 11 and the casing 12 and from an initial-stage rotor blade 13a and an initial-stage stationary blade 14a to a final-stage rotor blade 13b and a final-stage stationary blade 14b. It is assumed that a transonic blade of the first embodiment described below is employed for the initial-stage rotor blade 13 among them. However, the transonic blade of the present embodiment may be employed for the other rotor blades and the stationary blades.

Figure 1:
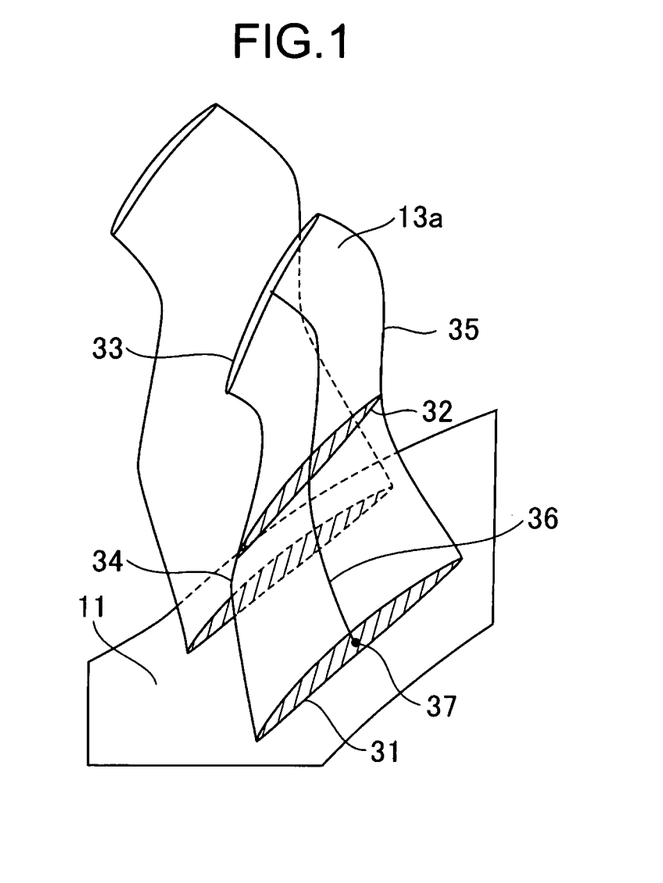
FIG. 1 is a perspective view of a transonic blade according to a first embodiment of the present invention.

A description is next given of the rotor blade 13a according to the first embodiment. FIG. 1 is a perspective view of a transonic blade according to the first embodiment. Referring to FIG. 1, the rotor blade 13a is formed of cross-sectional surfaces (airfoils), continued in the radial direction of the rotor 11, including a hub cross-sectional surface 31, a mean cross-sectional surface 32, and a tip cross-sectional surface 33. The hub cross-sectional surface 31 connects with the outer circumferential side of the rotor 11. The mean cross-sectional surface 32 is a cross-sectional surface located at a position half of a span in a direction vertical to the lengthwise direction of the rotor 11 and in a direction (the spanwise direction) extending from the rotor 11 toward the casing 12. The tip cross-sectional surface 33 is a cross-sectional surface most remote from the hub cross-sectional surface 31 in the spanwise direction. In the airfoil, a point located on the most upstream side is a leading edge 34 and a point located on the most downstream side is a trailing edge 35. A line connecting together the respective gravity center positions of the airfoils is referred to as a stacking line 36 and the gravity center position of the hub cross-sectional surface 31 is referred to as a stacking center 37.

Figure 4:
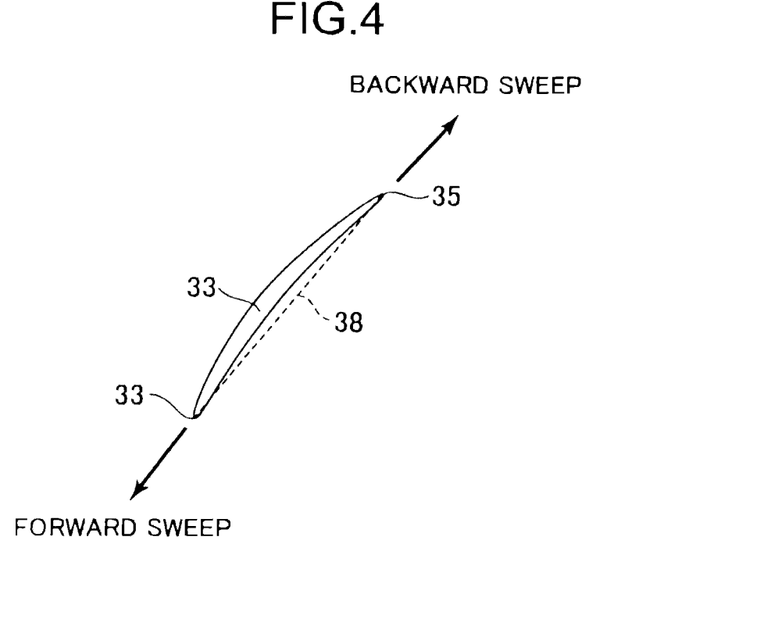
FIG. 4 is an enlarged view of a tip cross-sectional surface of the transonic blade according to the first embodiment.

A method of modifying the stacking line 36 is next described with reference to FIG. 4, which is an enlarged diagram of the tip cross-sectional surface of the transonic blade of the first embodiment. Referring to FIG. 4, a straight line connecting the leading edge 34 with the trailing edge 35 is referred to as a stagger line 38. The stacking line is a line connecting together the respective gravity center positions of the airfoils at the respective spanwise positions. The stacking line 36 is modified by being shifted in a lengthwise direction of the stagger line 38, i.e., in a direction along a straight line parallel to the stagger line 38. As regards the shifting direction, shifting from the stacking center toward the upstream side is called a forward sweep and shifting toward the downstream side is called a backward sweep. In the rotor blade 13a of the present embodiment, the vicinity of the hub cross-sectional surface 31 is the forward sweep, the vicinity of the mean cross-sectional surface 32 is the backward sweep, and the vicinity of the tip cross-sectional surface 33 is the forward sweep. In this way, the stacking line 36 is S-shaped.

Incidentally, it is said in general that the modification of the stagger line in a lean direction, i.e., a direction vertical to the stagger line 38 has no effect on aerodynamic performance so much. Therefore, when the stagger line 38 is shifted, a little shifting of the stagger line 38 in the lean direction has a less influence on aerodynamic performance.

Figure 5:
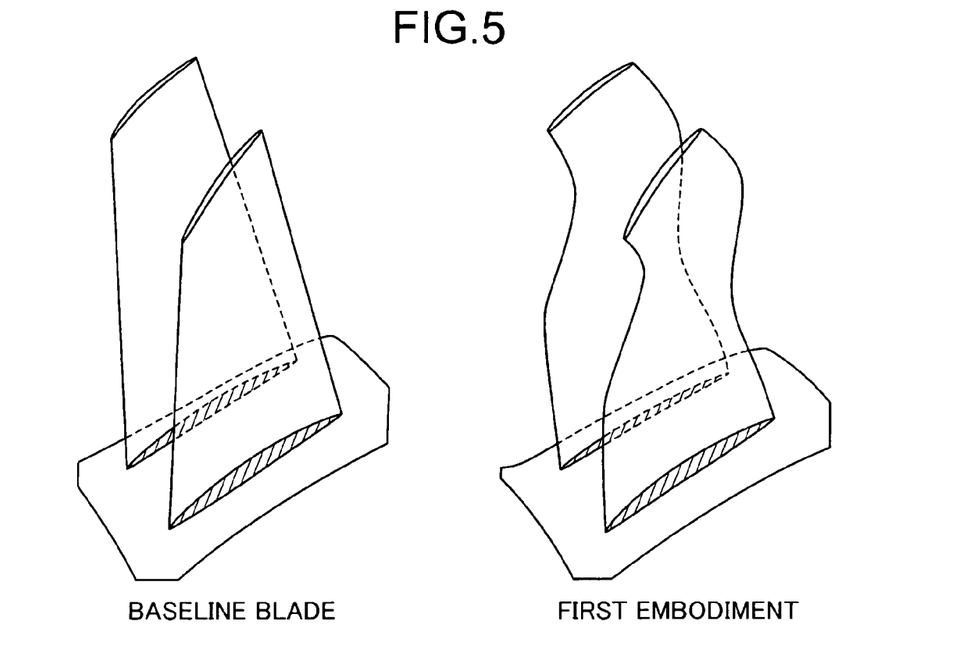
FIG. 5 is a perspective view illustrating a baseline blade and the transonic blade of the first embodiment.

A description is next given of conditions of a flow field in the rotor blade 13a according to the present embodiment. The compressor 1 is assumed to have a pressure ratio of about 15. In addition, the rotor blade 13a, an initial stage rotor blade, of the compressor 1 is assumed to have a pressure ratio of about 1.3 and a relative inflow Mach number of about 1.1 at its leading edge of tip region. A transonic blade that has a vertically straight stacking line, i.e., does not have shift is defined as a baseline blade. FIG. 5 is a perspective view illustrating the baseline blade and the transonic blade of the present embodiment. If the baseline blade is used in place of the rotor blade 13a under the conditions of the present embodiment, it is expected that a shock wave occurs on the back side of the blade from the mean cross-sectional surface to the tip cross-sectional surface, which causes a significant loss.

Figure 6:
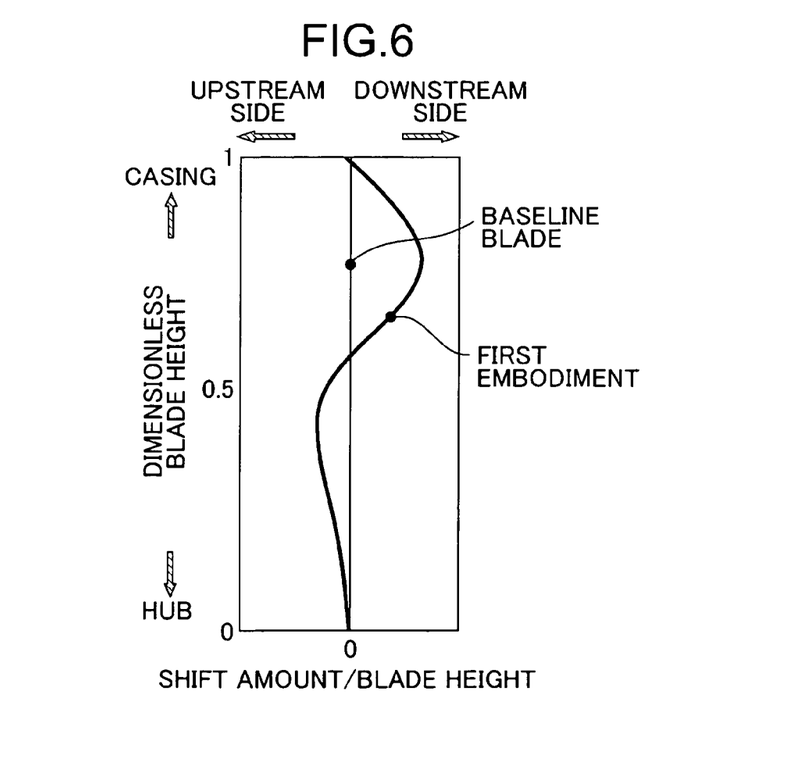
FIG. 6 is a comparative diagram of a stacking line between the transonic blade of the first embodiment and the baseline blade.
Figure 7:
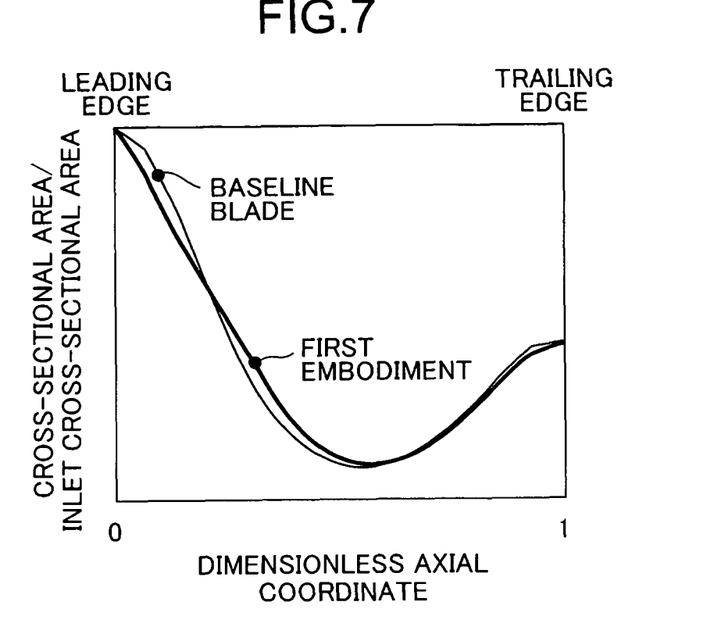
FIG. 7 is a comparative diagram of an axial cross-sectional area distribution between the transonic blade of the first embodiment and the baseline blade.

Characteristics of aerodynamic performance of the rotor blade 13a according to the present embodiment are described here by use of a comparison in shape with the baseline blade. FIG. 6 is a diagram illustrating a comparison in stacking line between the rotor blade 13a of the first embodiment and the baseline blade. FIG. 7 is a diagram illustrating a comparison in axial cross-sectional area distribution between the rotor blade 13a of the first embodiment and the baseline blade. In FIG. 6, a horizontal axis represents an amount of shift and a longitudinal axis represents spanwise positions. In FIG. 7, a horizontal axis represents axial positions in the case where it is assumed that at the hub cross-sectional surface the position of the blade leading edge 34 is 0 and the position of the trailing edge 35 is 1. The longitudinal axis represents the cross-sectional area of an airfoil relative to a flow path sectional area (an inlet cross-sectional area).

In general, the thickness of the blade in a direction perpendicular to the stagger line 38 is more increased as being closer to the position of the gravity center. In the baseline blade, the respective gravity center positions of the airfoils are the same in the lengthwise direction of the rotor 11; therefore, the gradient of the cross-sectional area variation of the blade with respect to the lengthwise direction of the rotor 11 is large. In contrast, in the rotor blade 13a of the present embodiment as illustrated in FIG. 6, the respective gravity center positions of the airfoils entirely lie on the leading edge side from the baseline blade in a range from the hub cross-sectional surface 31 to the mean cross-sectional surface 32, and on the trailing edge side from the baseline blade in a range from the mean cross-sectional surface 32 to the tip cross-sectional surface 33. In the blade shaped as above, as seen from FIG. 7, the gradient of the cross-sectional area variation of the blade is alleviated compared with that of the baseline blade. If the gradient of the cross-sectional area variation of the blade is alleviated, the variation of a flow rate on the cross-sectional surface is alleviated, which can reduce a shock loss.

Figure 8:
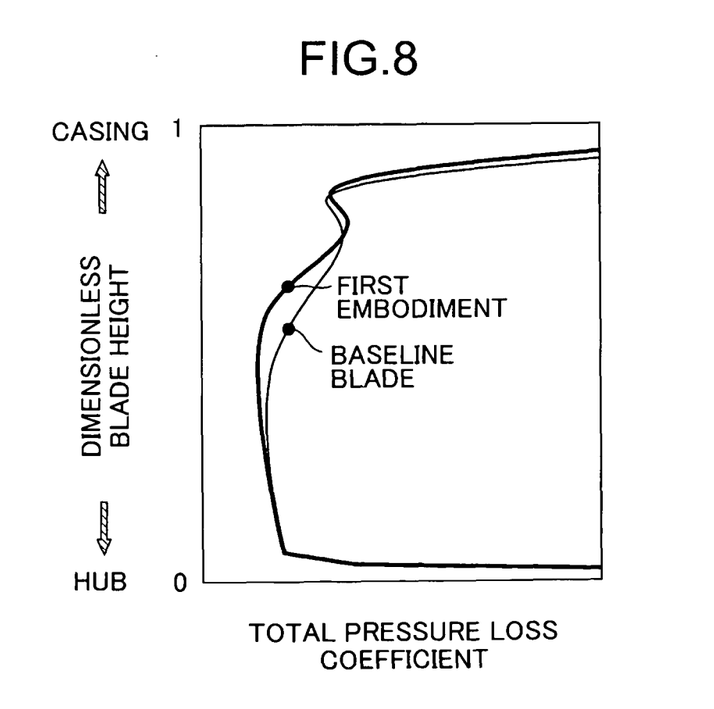
FIG. 8 is a comparative diagram of spanwise direction loss distribution between the transonic blade of the first embodiment and the baseline blade.
Figure 9:
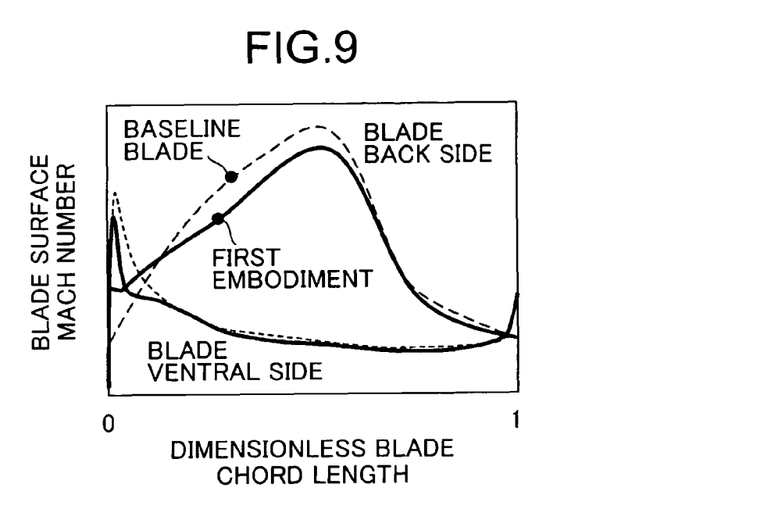
FIG. 9 illustrates a comparison of a blade surface Mach number distribution in blade cross-sectional surfaces from a mean cross-sectional surface 32 to a tip cross-sectional surface 33 between the transonic blade of the first embodiment and the baseline blade.

FIG. 8 illustrates a comparison in spanwise direction loss between the rotor blade 13a of the first embodiment and the baseline blade. FIG. 9 illustrates a comparison in blade surface Mach number distribution on the blade cross-sectional surfaces from the mean cross-sectional surface 32 to the tip cross-sectional surface 33. As illustrated in FIGS. 8 and 9, in the rotor blade 13a of the present embodiment, the variation of the cross-sectional area distribution is alleviated to thereby reduce the peak Mach number relative to that of the baseline blade, which reduces a shock loss. Similarly to the blade of JP-2008-115736-A, the development of the boundary layer close to the hub cross-sectional surface 31 is suppressed compared with the blade whose stacking line is simply shifted forward as in JP-7-224794-A. Thus, a loss of the rotor blade 13a close to the hub cross-sectional surface 31 is almost the same as that of the baseline blade.

Figure 10:
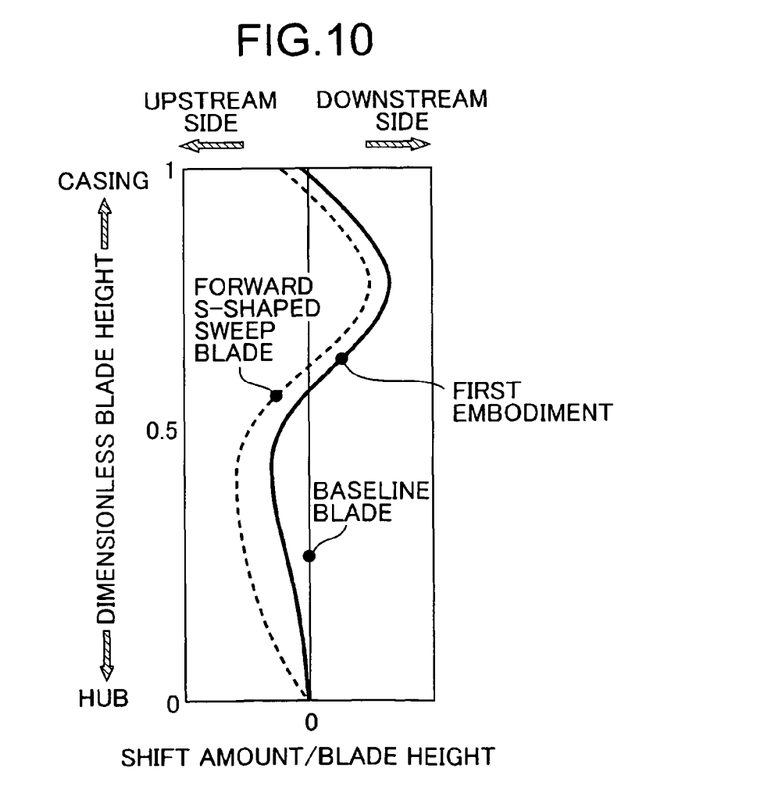
FIG. 10 is a diagram illustrating comparisons among respective stacking lines of the transonic blade of the first embodiment, the baseline blade, and a forward S-shaped sweep blade.
Figure 11:
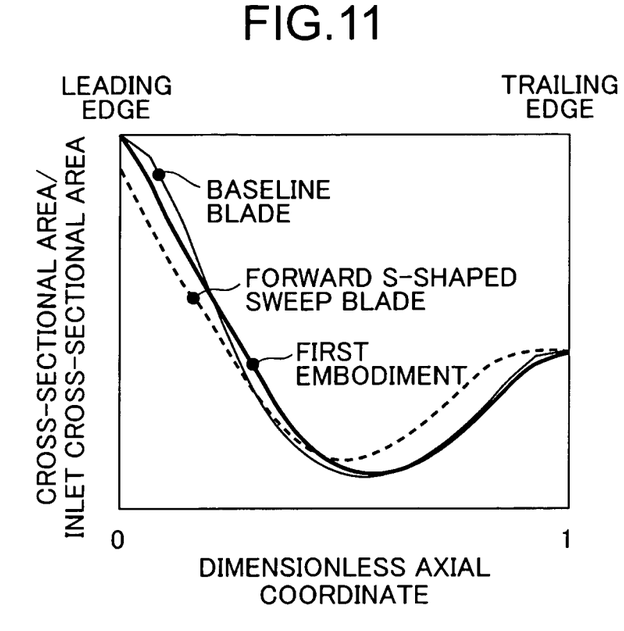
FIG. 11 is a diagram illustrating comparisons in axial cross-sectional area distribution among the transonic blade of the first embodiment, the baseline blade, and the forward S-shaped sweep blade.
Figure 12:
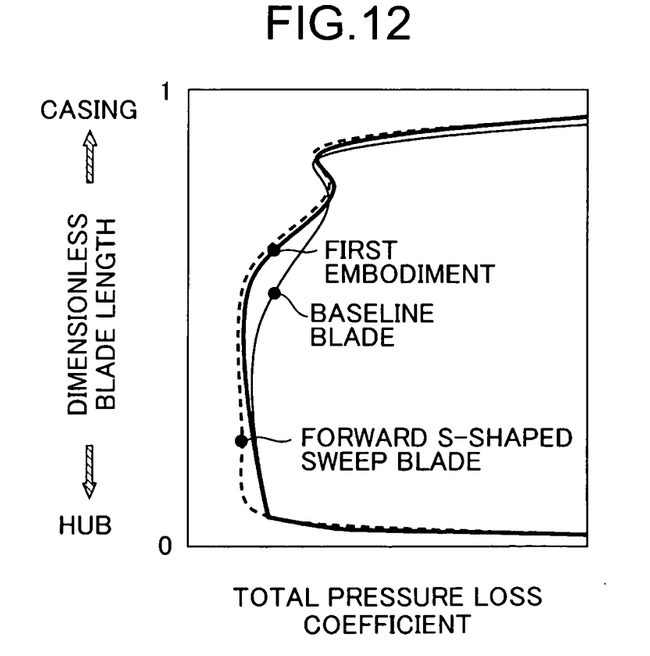
FIG. 12 is a diagram illustrating comparisons in spanwise direction loss distribution among the transonic blade of the first embodiment, the baseline blade, and the forward S-shaped sweep blade.

The characteristics of the strength of the rotor blade 13a according to the present embodiment are described in comparison with a forward S-shaped sweep blade shown below. The forward S-shaped sweep blade in this specification means a transonic blade in which a forward shift amount is increased from the tip cross-sectional surface and from the hub cross-sectional surface to the mean cross-sectional surface in order to improve aerodynamic performance. FIG. 10 is a diagram illustrating comparisons among the respective stacking lines of the rotor blade 13a of the present embodiment, the baseline blade, and the forward S-shaped sweep blade. FIG. 11 is a diagram illustrating comparisons in cross-sectional area distribution among the rotor blade 13a of the present embodiment, the baseline blade, and the forward S-shaped sweep blade. FIG. 12 is a diagram illustrating comparisons in spanwise direction loss distribution among the rotor blade 13a of the present embodiment, the baseline blade, and the forward S-shaped sweep blade. As illustrated in FIGS. 10 to 12, the adoption of the forward S-shaped sweep blade can increase the shift amount from the tip cross-sectional surface 33 and from the hub cross-sectional surface 31 to the mean cross-sectional surface 32. Thus, the variation in cross-sectional area distribution of the forward S-shaped sweep blade can more largely be alleviated than that of the rotor blade 13a, thereby achieving a significant reduction in loss.

Figure 13:
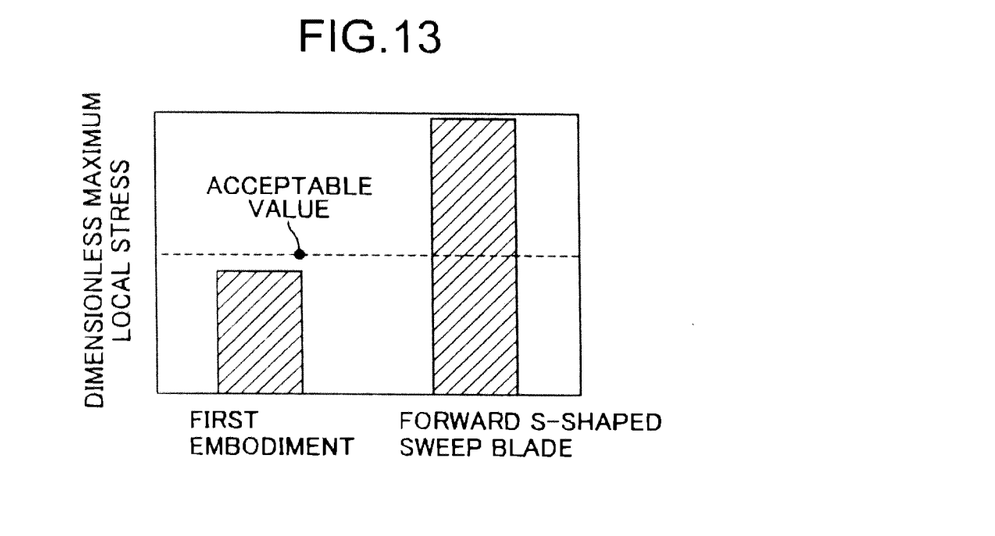
FIG. 13 illustrates a comparison in maximum local stress between the transonic blade of the first embodiment and the forward S-shaped sweep blade.
Figure 14:
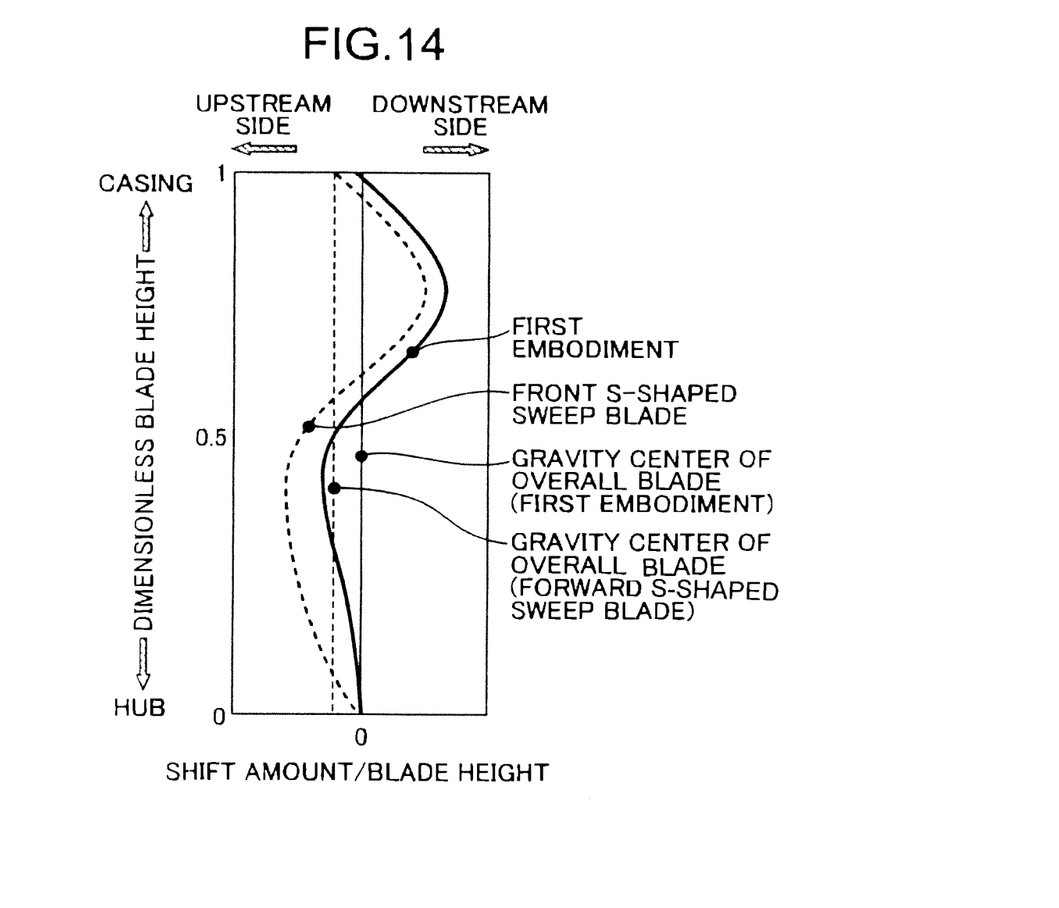
FIG. 14 illustrates a comparison in stacking line between the transonic blade of the first embodiment and the forward S-shaped sweep blade.

On the other hand, the forward S-shaped sweep blade has concern about strength. To explain this, FIG. 13 illustrates a comparison in maximum local stress between the rotor blade 13a of the present embodiment and the forward S-shaped sweep blade. In addition, FIG. 14 illustrates a comparison in stacking line between the rotor blade 13a of the present embodiment and the forward S-shaped sweep blade. A longitudinal axis of FIG. 13 represents a value obtained by subjecting the maximum local stress to non-dimension by the acceptable value of the material. Incidentally, both the rotor blade 13a of the present embodiment and the forward S-shaped sweep blade cause the maximum local stress at a position close to the leading edge of the hub cross-sectional surface. As illustrated in FIGS. 13 and 14, the forward S-shaped sweep blade has the gravity center of the overall blade located upstream of the stacking center. This increases the local stress applied to the vicinity of the leading edge of the hub cross-sectional surface, at which the local stress may probably exceed the acceptable value of the material. That is to say, to use the forward S-shaped sweep blade in a real machine, countermeasures such as use of a high-grade material and a change of design are required. Thus, it is expected that various issues such as an increase in cost and the like may occur.

In contrast to this, the rotor blade 13a of the present embodiment is configured such that the position of the gravity center falls within a desired range from the stacking center. The desired range means a range where the local stress close to the leading edge of the hub cross-sectional surface 31 satisfies the acceptable value. Specifically, it becomes apparent from calculation that it is desirable that the position of the gravity center of the rotor blade 13a in this case may be such that the an error of an axial distance from the stacking center 37 is generally not greater than 1% of the span.

Incidentally, to satisfy the position of the gravity center of the overall blade in the rotor blade 13a of the present embodiment, the position of the gravity center of at least a portion from the mean cross-sectional surface 32 to the tip cross-sectional surface 33 must be on the downstream side of the stacking center 37. If this condition is satisfied, it is not problematic that the tip cross-sectional surface 33 lies on the upstream side of the stacking center 37. However, if the tip cross-sectional surface 33 is excessively shifted to the upstream side, the curvature of the stacking line 36 is increased in a portion from the mean cross-sectional surface 32 to the tip cross-sectional surface 33, so that the local stress of such a portion may probably exceed the acceptable value. It is desirable, therefore, that the tip cross-sectional surface 33 be not located on the most upstream side in the overall blade but located on the downstream side of any blade cross-sectional surface from the hub cross-sectional surface 31 to the mean cross-sectional surface 32.

Summing up the above, the rotor blade 13a of the present embodiment is characterized as below: A difference ε in the lengthwise direction of the rotating shaft 4 between the gravity center of the overall transonic blade and the stacking center which is the gravity center position of the hub cross-sectional surface is set not to exceed the strength limit of the leading edge of the hub cross-sectional surface. A portion of the stacking line which is a line connecting together the respective gravity centers of the cross-sectional surfaces from the hub cross-sectional surface to the tip cross-sectional surface is located on the downstream side of the stacking center in the flow direction of the working fluid main flow. Further, the rotor blade 13a has the mean cross-sectional surface which is a third cross-sectional surface between the hub cross-sectional surface and the tip cross-sectional surface. The stacking line protrudes toward the downstream side in the main flow direction between the mean cross-sectional surface and the tip cross-sectional surface and toward the upstream side in the main flow direction between the mean cross-sectional surface and the hub cross-sectional surface.

Since having the characteristics as described above, the rotor blade 13a of the present embodiment can suppress an increase in loss on the hub cross-sectional surface side while reducing the loss on the tip cross-sectional surface side compared with the blade not shifted similarly to the blade of JP-2008-115736-A. Further, the rotor blade 13a of the present embodiment can reduce the local stress adjacent to the leading edge of the hub cross-sectional surface, which enhances reliability also structurally compared with the forward S-shaped sweep blade and the blade of JP-2008-115736-A. In short, the rotor blade 13a of the present embodiment can be said as a blade that concurrently achieves an improvement in aerodynamic performance and in reliability.

For the sake of simplicity, in the present embodiment the third cross-sectional surface that is a cross-sectional surface other than the tip cross-sectional surface and the hub cross-sectional surface is described as the mean cross-sectional surface. However, a cross-sectional surface other than this cross-sectional surface can provide a like effect. Specifically, "the mean cross-sectional surface" in the description of the present embodiment may be replaced with "the third cross-sectional surface". In this case, if the third cross-sectional surface is taken as a mean cross-sectional surface which is a cross-sectional surface located at a position corresponding to half of the span, there is a merit of alleviating the complexity of design.

Second Embodiment

Figure 15:
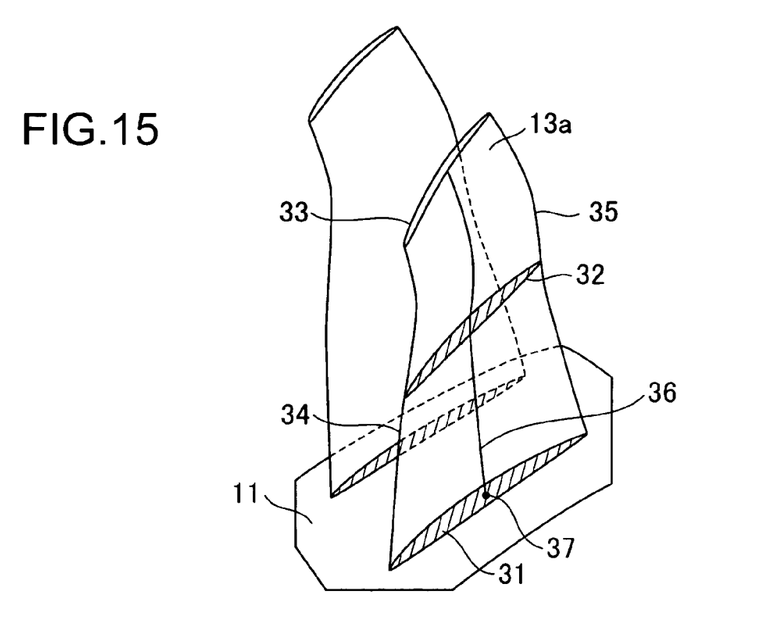
FIG. 15 is a perspective view of a transonic blade according to a second embodiment of the present invention.

FIG. 15 is a perspective view of a rotor blade 13a according to a second embodiment. The rotor blade 13a of the second embodiment is different from the rotor blade of the first embodiment in that a stacking line extending from a hub cross-sectional surface 31 to a mean cross-sectional surface 32 is a straight line and a tip cross-sectional surface is located on the most upstream side. Incidentally, the same elements as in FIG. 1 are denoted with like reference numerals and their detailed descriptions are omitted.

Figure 16:
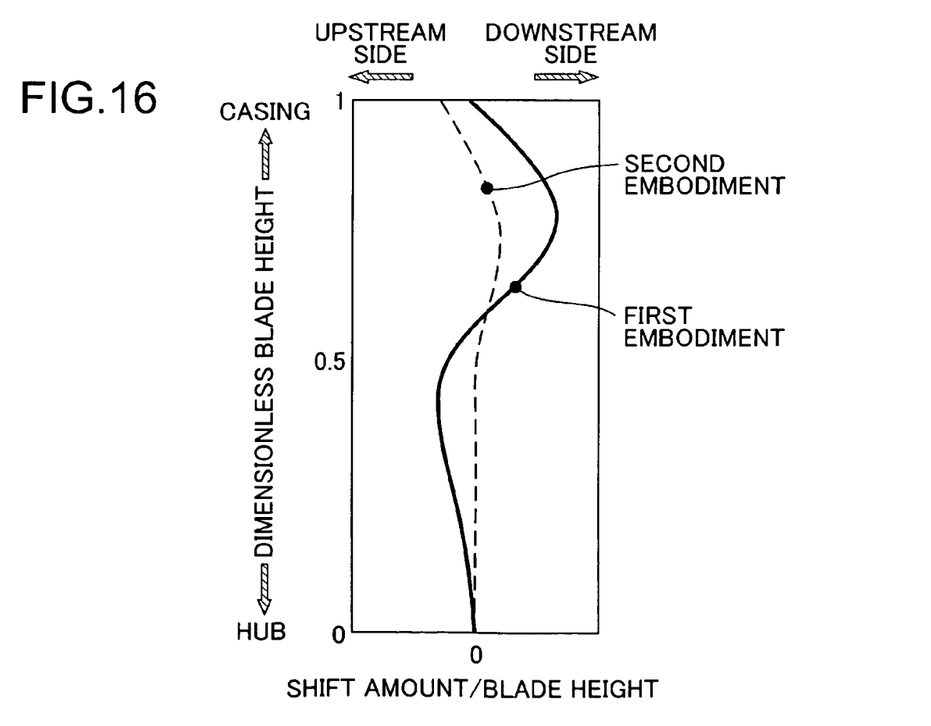
FIG. 16 illustrates a comparison between the stacking line of the first embodiment and that of the second embodiment.

Characteristics of the rotor blade 13a of the present embodiment are described with reference to FIG. 16. FIG. 16 illustrates a comparison between the stacking line of the present embodiment and that of the first embodiment. The stacking line 36 of the present embodiment is a straight line extending from the hub cross-sectional surface 31 to the mean cross-sectional surface 32 and is shaped to protrude toward the downstream side in the main flow direction from the mean cross-sectional surface 32 to the tip cross-sectional surface 33. Incidentally, in the present embodiment, a range where the stacking line is a straight line terminates at the mean cross-sectional surface. However, the stacking line extending as a straight line may extend from the mean cross-sectional surface 32 toward the tip cross-sectional surface 33 or may not reach the mean cross-sectional surface 32.

The rotor blade 13a of the present embodiment does not have a shape shifted toward the upstream side in the vicinity of the hub cross-sectional surface like that of the first embodiment. Therefore, a flow rate in the vicinity of the hub cross-sectional surface 31 more increases than that of the first embodiment and the development of a boundary layer adjacent to the hub cross-sectional surface 31 can be suppressed. On the other hand, the rotor blade 13a of the present embodiment is formed to protrude toward the downstream side in a range from the mean cross-sectional surface 32 to the tip cross-sectional surface 33. Therefore, the variation in cross-sectional area distribution is alleviated by the shift, which can reduce a shock loss at this portion.

The rotor blade 13a of the present embodiment is configured as below. The blade cross-sectional surface adjacent to the hub cross-sectional surface 31 is not shifted toward the upstream side. Therefore, it is harder for stress to concentrate on the leading edge of the hub cross-sectional surface 31 compared with the first embodiment. Thus, it is probably that if the error ϵ between the gravity center position of the overall blade and the stacking center 37 falls within given values, local stress is reduced compared with the transonic blade of the first embodiment.

Incidentally, the rotor blade 13a of the present embodiment is described as a blade shaped generally like "J" having one flexion point of the stacking line. However, also a blade shaped like "S" or "W" having two or more flexion points can produce a like effect. However, unnecessarily increased flexion points lead to an increase in the local curvatures of the stacking line. The increased local stress could be a factor of lowering reliability. Thus, it is desirable that the transonic blade of the present embodiment have fewer flexion points.

In the airfoil of the rotor blade 13a according to the present embodiment having one flexion point, what contributes to shifting of the gravity center position toward the upstream side is only an airfoil adjacent to the tip cross-sectional surface 33 located on the upstream of the stacking center 37 in the axial-lengthwise direction. The gravity center of the airfoil other than this airfoil lies downstream of the stacking center 37 in the axial-lengthwise direction. Therefore, this gravity center does not contribute to the shifting of the gravity center position or contributes to shifting of the gravity center position toward the upstream side. This means that, to allow the gravity center position of the overall blade to come close to the stacking center, the tip cross-sectional surface 31 is shifted toward the upstream side of the stacking center 37. In other words, the transonic blade of the present embodiment having one flexion point has an airfoil in which the tip cross-sectional surface 31 has the largest amount of shift toward the upstream side.

Summing up the above, the transonic blade of the present embodiment can suppress an increase in loss on the hub cross-sectional surface side while reducing a loss on the tip cross-sectional surface side compared with the blade not shifted. Further, the transonic blade of the present embodiment has a larger effect of suppressing an increase in loss than the rotor blade 13a of the first embodiment. The transonic blade of the present embodiment can further reduce local stress at the leading edge of the hub cross-sectional surface than the rotor blade 13a of the first embodiment.

Incidentally, in both the transonic blades of the first and second embodiments, as positions where respective blade-thicknesses of the cross-sectional surfaces are maximized (a ratio relative to chord length) are more aligned with one another, an effect of enhancing aerodynamic performance is more increased compared with that of the baseline blade. This is because of the following: As the respective positions of the maximum blade-thicknesses of the blade are more aligned with one another, the minimum cross-sectional area of the overall blade is more likely to be small. That is to say, it becomes easy for the shift to alleviate the variation in cross-sectional area.

The present invention can be applied to blades that have an operating condition as a flow field where flow has a transonic speed or more causing shock waves between blades. The applications of the transonic blade of the present invention include axial-flow rotating machines such as a gas turbine and an aviation engine.

What is claimed is:
1. A transonic blade comprising:
a hub cross-sectional surface joined to a rotating shaft or an outer circumferential side casing of a rotating machine;
a tip cross-sectional surface located furthest from the hub cross-sectional surface in a spanwise direction which is a vertical direction of the rotating shaft;
a leading edge located on an upstream side in a flow direction of a working fluid main flow; and a trailing edge located on a downstream side in the flow direction of the working fluid main flow;
wherein at least a part of a passing working fluid flow has a transonic speed or higher,
wherein a portion of a stacking line which is a line connecting together respective gravity centers of cross-sectional surfaces located from the hub cross-sectional sur- face to the tip cross-sectional surface is located on a downstream side of a stacking center which corresponds to a gravity center position of the hub cross-sectional surface in the flow direction of the working fluid main flow, further comprising a third cross-sectional surface between the hub cross-sectional surface and the tip cross-sectional surface, wherein the stacking line protrudes toward the downstream side of the main flow direction between the third cross-sectional surface and the tip cross-sectional surface, the stacking line protrudes toward the upstream side in the main flow direction between the third cross-sectional surface and the hub cross-sectional surface, a gravity center position of the tip cross-sectional surface is located on the upstream side of the stacking center in the flow direction of the working fluid main flow, and a gravity center of the overall transonic blade is located on the downstream side of the stacking center.

2. The transonic blade according to claim 1,
wherein a difference $\epsilon$ in a lengthwise direction of the rotating shaft between the gravity center of an overall transonic blade and the stacking center is set not to exceed a strength limit of the leading edge of the hub cross-sectional surface.

3. The transonic blade according to claim 2,
wherein the $\epsilon$ is 1% or less of span.

4. The transonic blade according to claim 3,
wherein the $\epsilon$ is generally equal to 0.

5. The transonic blade according to claim 1,
wherein a gravity center of the transonic blade between the third cross-sectional surface and the tip cross-sectional surface is located on the main flow-directional downstream side of the stacking center.

6. The transonic blade according to claim 1,
wherein a position corresponding to a largest amount of shifting of the stacking line toward the upstream side lies between the third cross-sectional surface and the hub cross-sectional surface.

7. The transonic blade according to claim 1,
wherein the third cross-sectional surface is a mean cross-sectional surface.

8. The transonic blade according to claim 1,
wherein respective positions of maximum thicknesses relative each to chord length are aligned with one another in airfoils located from the tip cross-sectional surface to the hub cross-sectional surface.

9. A compressor including a rotating shaft, a casing, a plurality of rotor blades, and a plurality of stationary blades, at least a part of a passing working fluid flow having a transonic speed or higher,
wherein a rotor blade of the plurality of rotor blades on the most upstream side in a main flow direction comprises:
a hub cross-sectional surface joined to the rotating shaft;
a tip cross-sectional surface located furthest from the hub cross-sectional surface in a spanwise direction which is a vertical direction of the rotating shaft;
a leading edge located on an upstream side in a flow direction of a working fluid main flow; and
a trailing edge located on a downstream side in the flow direction of the working fluid main flow;
wherein a difference $\epsilon$ in a lengthwise direction of the rotating shaft between the gravity center of an overall transonic blade and a stacking center which corresponds to a gravity center position of the hub cross-sectional surface is set not to exceed a strength limit of the leading edge of the hub cross-sectional surface, wherein a portion of a stacking line which is a line connecting together respective gravity centers of cross-sectional surfaces located from the hub cross-sectional surface to the tip cross-sectional surface is located on the downstream side of the stacking center in the flow direction of the working fluid main flow, the blade further comprising a third cross-sectional surface between the hub cross-sectional surface and the tip cross-sectional surface, wherein the stacking line protrudes toward the downstream side of the main flow direction between the third cross-sectional surface and the tip cross-sectional surface, the stacking line protrudes toward the upstream side in the main flow direction between the third cross-sectional surface and the hub cross-sectional surface, a gravity center position of the tip cross-sectional surface is located on the upstream side of the stacking center in the flow direction of the working fluid main flow, and a gravity center of the overall transonic blade is located on the downstream side of the stacking center.

10. A method of designing a transonic blade, the transonic blade including a hub cross-sectional surface joined to a rotating shaft or an outer circumferential side casing of a rotating machine; a tip cross-sectional surface located furthest from the hub cross-sectional surface in a spanwise direction which is a vertical direction of the rotating shaft; a third cross-sectional surface between the hub cross-sectional surface and the tip cross-sectional surface; a leading edge located on an upstream side in a flow direction of working fluid; and a trailing edge located on a downstream side in the flow direction of working fluid; at least a part of a passing working fluid flow having a transonic speed or higher, the method comprising:
locating a portion of a stacking line which is a line connecting together respective gravity centers of cross-sectional surfaces located from the hub cross-sectional surface to the tip cross-sectional surface, on a downstream side of a stacking center which corresponds to a gravity center position of the hub cross-sectional surface in the flow direction of working fluid,
determining a difference $\epsilon$ in a lengthwise position of the rotating shaft between the gravity center of an overall transonic blade and the stacking center so as not to exceed a strength limit of the leading edge of the hub cross-sectional surface,
making the stacking line protrude toward the downstream side of the main flow direction between the third cross-sectional surface and the tip cross-sectional surface,
making the stacking line protrude toward the upstream side in the main flow direction between the third cross-sectional surface and the hub cross-sectional surface,
locating a gravity center position of the tip cross-sectional surface on the upstream side of the stacking center in the flow direction of the working fluid main flow, and
locating a gravity center of the overall transonic blade on the downstream side of the stacking center.

* * * * *